United States Patent [19]

Epp

[11] 4,050,714
[45] Sept. 27, 1977

[54] TRAILER HITCH ATTACHMENT

[76] Inventor: Walter H. Epp, 64 Highcourt Cres., St. Catharines, Ontario, Canada, L2M 3M6

[21] Appl. No.: 658,479

[22] Filed: Feb. 17, 1976

[51] Int. Cl.² .............................................. G60D 1/00
[52] U.S. Cl. ..................................... 280/495; 403/104
[58] Field of Search ................ 280/495; 403/104, 377, 403/109

[56] References Cited

U.S. PATENT DOCUMENTS

| 2,622,892 | 12/1952 | Lowman | 280/495 |
| 2,747,892 | 5/1956 | Jones | 280/495 |
| 3,549,174 | 12/1970 | Miles | 280/495 |
| 3,768,837 | 10/1973 | Reese | 280/495 |

Primary Examiner—Robert R. Song

[57] ABSTRACT

An attachment for a trailer hitch to eliminate essentially all the play in a coupling of a trailer hitch head to a trailer hitch drawbar includes an adjustable spacing means to space the hitch head from the drawbar. The distance between the two ends of the attachment is adjustable in a direction parallel to the longitudinal axis of the trailer hitch. One end of the attachment is mounted on the drawbar and the other end of the attachment is mounted on the hitch head. When the spacing means is adjusted the hitch head is moved relative to the drawbar in a direction parallel to the longitudinal axis of the hitch to eliminate essentially all of the play in the hitch.

3 Claims, 5 Drawing Figures

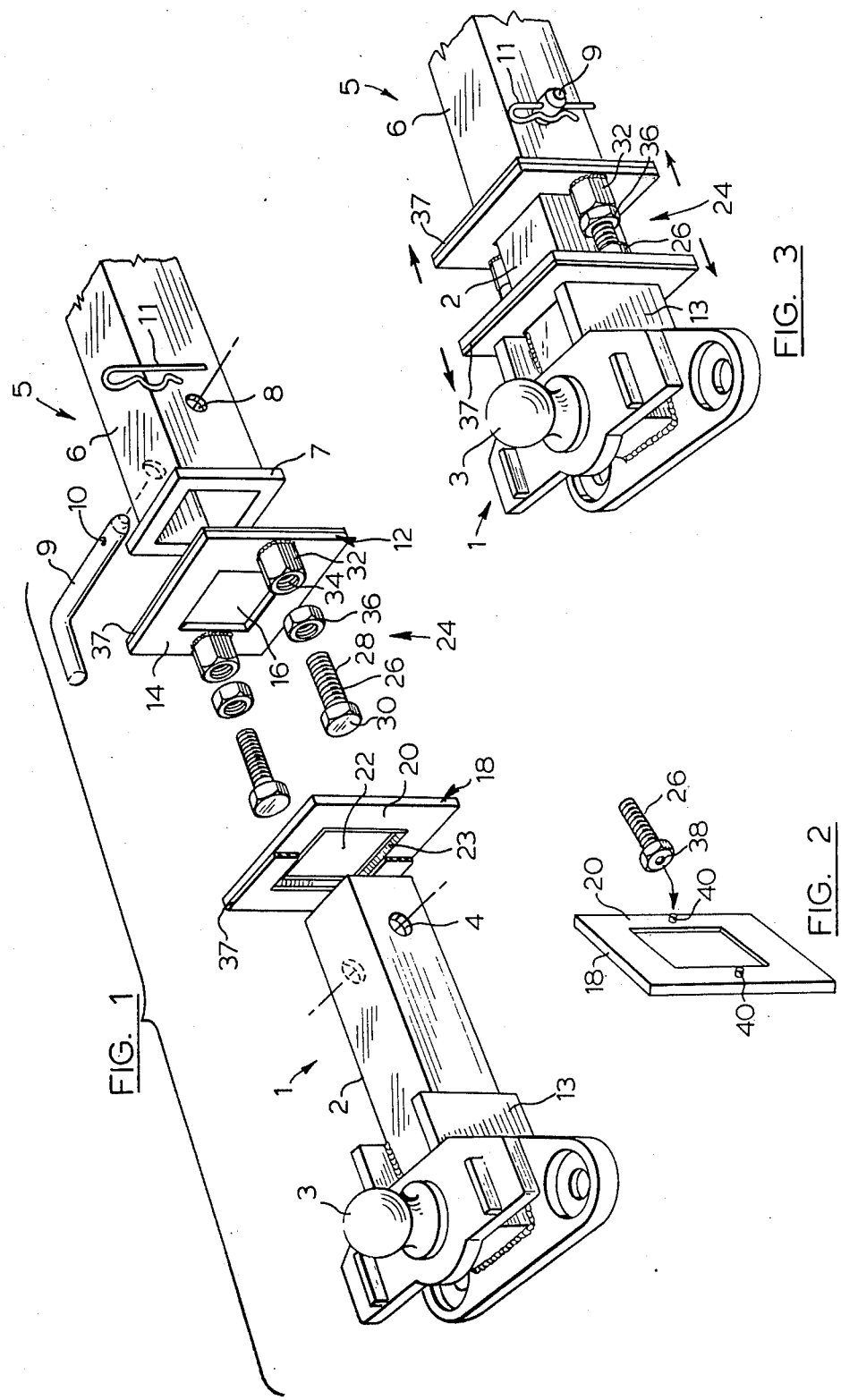

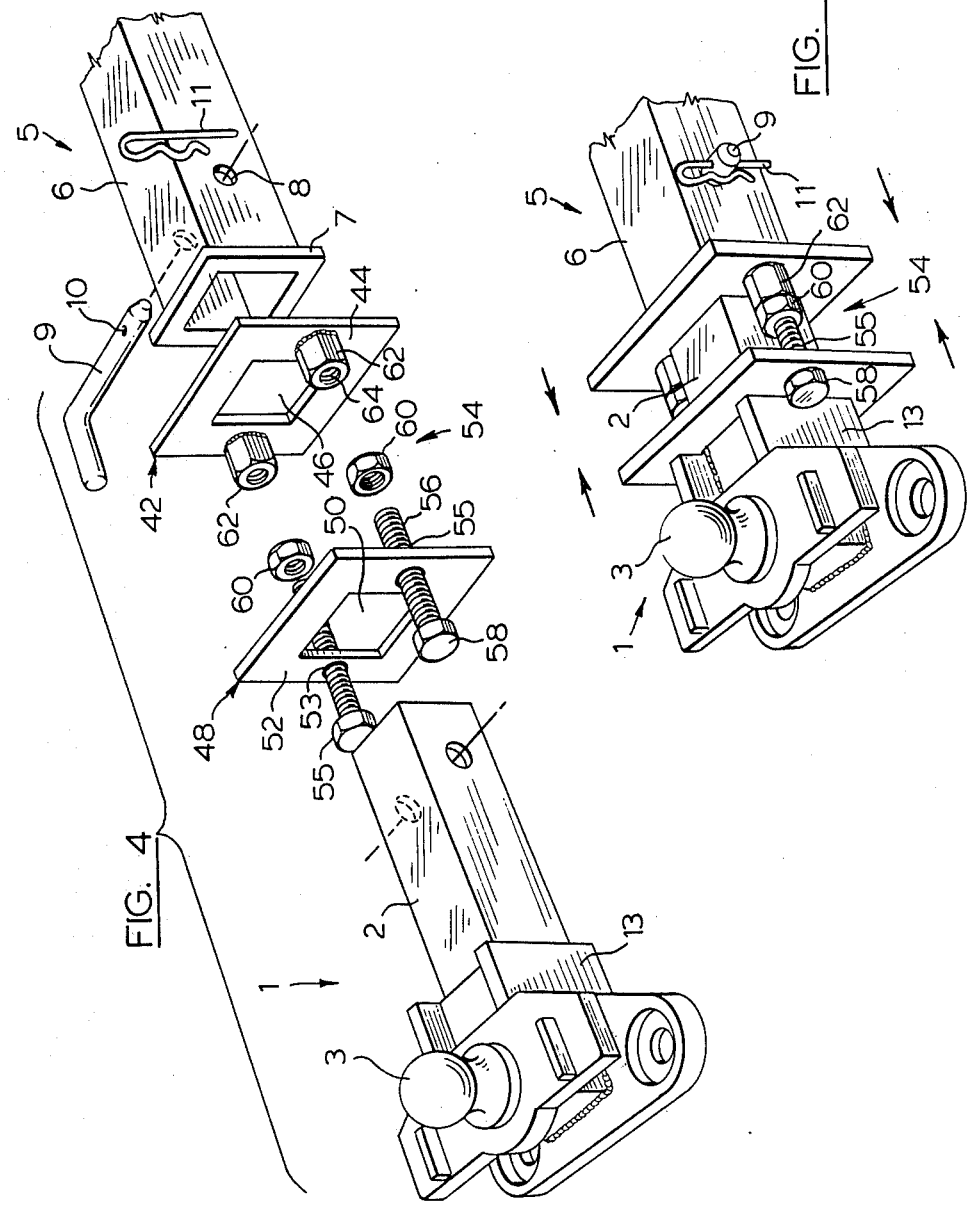

TRAILER HITCH ATTACHMENT

FIELD OF THE INVENTION

This invention relates to a trailer hitch attachment to be used on a trailer hitch where a trailer hitch head is removably coupled to a trailer hitch drawbar to eliminate essentially all the play in a coupling of a trailer hitch head to a trailer hitch drawbar.

BACKGROUND OF THE INVENTION

Trailer hitches consisting of a trailer hitch drawbar and a trailer hitch head are generally of the load equalizing design. The drawbar is mounted to the towing vehicle frame and the hitch head is removably coupled to the drawbar and secured thereto by way of a locking member, such as a clevis pin. However, in order to facilitate manual assembly of the hitch, the parts are not tightly fitted together and there is a certain amount of play in the coupling of the hitch head to the drawbar. When a trailer is attached to the hitch and is being towed, this play results in wear on all the components of the trailer hitch, which in turn results in more play in the coupling of the hitch head to the drawbar. As the play increases the trailer begins to move relative to the towing vehicle to set up unusually large shock loads on the hitch. These loads are then transmitted to the towing vehicle and subsequently damage the frame and transmission of the vehicle. The trailer which becomes difficult to control as a result of the play can sway or even fishtail to create a hazard on the road.

It is therefore an object of this invention to provide an attachment to be used on a trailer hitch where a trailer hitch head is removably coupled to a trailer hitch drawbar to eliminate essentially all of the play in the coupling of a hitch head to a drawbar.

It is another object of the invention to eliminate essentially all of the wear on the individual components of a trailer hitch of a load equalizing design.

It is a further object of the invention to provide a trailer hitch attachment to reduce wear and damage to the frame and transmission of a towing vehicle.

It is yet another object of the invention to provide a trailer hitch attachment which is adjustable and easy to mount to a trailer hitch having a drawbar and removably coupled hitch head.

It is yet a further object of the invention to provide an attachment to be used with a trailer hitch of a load equalizing design to provide more control over a trailer and to prevent a trailer from swaying and fishtailing.

BRIEF SUMMARY OF THE INVENTION

The attachment according to this invention is to be mounted on a trailer hitch where a drawbar is secured to an automobile frame and a hitch head is removably coupled to the drawbar. The attachment includes a length adjustment or spacing means which consists of one or more adjustable spacing members so that the length of the attachment may be adjusted in a direction parallel to the longitudinal axis of the hitch. One end of the attachment is mounted to the hitch head and the other end is mounted to the drawbar. As the length of the attachment is adjusted, the hitch head moves relative to the drawbar. This adjustment is continued unitl the hitch head can no longer move with respect to the drawbar while the clevis pin is in a locking position and virtually all the play in the coupling is eliminated. The adjustable members of the spacing means are then locked at the desired adjusted length by way of a locking means which is also provided on the attachment.

DESCRIPTION OF THE DRAWINGS

The aforementioned and other objects, advantages and features of the invention will become apparent in the following detailed description of the preferred embodiments according to this invention as shown in the drawings wherein;

FIG. 1 is a partial elevational view of an uncoupled trailer hitch of the load equalizing design showing a preferred embodiment of a trailer hitch attachment according to this invention in position to be mounted to a trailer hitch.

FIG. 2 is an elevational view showing additional preferred features of the trailer hitch attachment of FIG. 1.

FIG. 3 is a partial elevational view of a coupled trailer hitch showing the attachment of FIG. 1 mounted to a trailer hitch according to this invention.

FIG. 4 is a partial elevational view of an uncoupled hitch of the load equalizing design showing an alternate preferred construction of an unmounted trailer hitch according to this invention.

FIG. 5 is a partial elevational view of a coupled trailer hitch showing the trailer hitch attachment of FIG. 4 mounted to a trailer hitch.

DETAILED DESCRIPTION OF THE PREFERRED EMBODIMENTS

Referring to FIGS. 1 through 3 a trailer hitch comprises a hitch head generally indicated at 1, a drawbar generally indicated at 5, a locking member in the form of a clevis pin 9 and a cotter pin 11. The hitch head 1 is provided with a shank 2, a ball 3 and a shank clevis pin aperture 4. The drawbar 5 is provided with a hollow tubular member 6 adapted to receive the shank 2, a lip 7 at its free end and a drawbar clevis pin aperture 8. Clevis pin 9 is provided with cotter pin aperture 10.

In this preferred embodiment the attachment comprises a first plate 12, a second plate 18 and an adjustable spacing means 24 which is located between the first and second plates. The first plate 12 is provided with a first skirt portion 14 and a first aperture 16. The second plate 18 has a second skirt portion 20 and a second aperture 22. Both apertures have a shape and size adapted to permit the shank to extend through them. Preferably they are approximately 2inches square and the are located in the central part of the plates. The second plate may be provided with a second aperture having a bevelled edge 23 to accommodate fillet weld when the rectangular portions 13 are welded to shank 2. Spacing means 24 includes two spacer members as shown in FIGS. 1 through 3. Each spacing member includes a bolt 26, which is provided with threads 28, a means for facilitating adjustment in the form of bolt head 30, a spacer member adjustor in the form of nut 32 which is provided with cooperating threads 34 and a locking means in the form of lock nut 36. When employing two members they should be positioned adjacent opposing sides of the shank 2, opposite one another equal distances slightly above or below the centre of the shank 2 as shown in the drawings. This will tilt the hitch and attached trailer upwardly or downwardly relative to the drawbar and when the trailer is tilted in this manner it cannot rock up and down and is easier to control. Furthermore, because the spacer members are mounted on opposing sides of the shank, they essentially prevent any sideways movement of the plates and preclude fishtailing of a trailer being towed by an automobile.

The faces of skirt portions 14 and 20 which are mounted to drawbar 5 and hitch head 1 respectively may each be provided with resilient backing 37. The resilient material should be no more than ⅛ of an inch in thickness and is preferably about 1/16 of an inch thick. Skirt portion 20 may also be provided on its forward face with locaters 40 and bolts 26 with locater receiving means 38 as seen in FIG. 2.

In operation, second plate 18 is mounted on the hitch head 1 by fitting shank 2 through second aperture 22 and abutting second skirt portion 20 against rectangular portions 13 of hitch head 1 to prevent rearward movement of second plate 18 with respect to the hitch head. First plate 12 is mounted on drawbar 5 with skirt portion 14 abutting lip 7 at the free end of hollow tubular member 6 to prevent forward movement of first plate 12 with respect to the drawbar, and shank 2 extending through first aperture 16 into the hollow tubular member. Clevis pin 9 is fitted through drawbar clevis pin aperture 8 and shank clevis pin aperture 4 to lock the shank in the hollow tubular member. Cotter pin 11 is then fitted in cotter pin aperture 10 to hold the clevis pin in a locking position.

As noted above, adjustable spacing means 24 is located between first plate 12 and second plate 18. One end of the spacing means contacts first skirt portion 14 and the other end contacts second skirt portion 20. The threads 28 of bolts 26 are threadably engaged with cooperating threads 34 of nuts 32. The heads 30 are accessible for adjustment by a tool. The attachment is adjusted by grasping heads 30 with a first tool and turning bolts 26 with respect to spacer nuts 32 to extend the length of the spacing means. In this embodiment the nuts 32 are either secured to the second skirt portion by means such as welding or held against rotation by means of a second tool. This adjustment continues until the length of spacing means 24 can no longer be extended while shank 2 is locked in hollow tubular member 6 by clevis pin 9 and any play which is the result of a poor or loose fit or earlier wear is essentially eliminated by the spreading action of the attachment. Lock nuts 36 are then adjusted to maintain the desired adjusted length of the spacing members. The resilient backing 37 acts as a sound dampener to eliminate noise travelling through the hitch.

With reference to FIGS. 4 and 5 showing an alternate construction of a preferred embodiment, a third plate generally indicated at 48 is mounted on and secured to hitch head 1 by means such as welding with a shank 2 extending through third aperture 50. Fourth plate 42 is mounted on or near the free end of hollow tubular member 6 and secured thereto by means such as welding. Shank 2 extends through fourth aperture 46 and is secured in hollow tubular member 6 by clevis pin 9. Third skirt portion 52 includes spacer member apertures 53.

The spacing means generally indicated at 54 consists of two spacing members. The spacing members include bolts 55 provided with threads 56, means for facilitating adjustment in the form of heads 58, spacer member adjustors in the form of nuts 62 which are mounted on fourth skirt portion 44 and which are provided with cooperating threads 64 to threadably engage threads 56 of bolts 54, and locking means in the form of lock nuts 60. Bolts 55 are fitted in spacer member apertures 53 such that heads 58 which cannot pass through the bolt apertures abut the rearward face of third skirt portion 52 and threads 56 extend through the bolt apertures and beyond the forward face of third skirt portion 52. The spacer members should be placed adjacent opposite sides of shank 2 opposing one another equal distances slightly above or below the centre of the shank as shown in the drawings.

When the attachment is in use, threads 56 of bolts 55 are threadably engaged with cooperating threads 64 of nuts 62. Accessible heads 58 which can easily be grasped by a tool and are turned to adjust bolts 54 with respect to nuts 62 to shorten the length of the spacing means and to clamp the hitch head to the drawbar. Nuts 62 can either be secured to fourth plate 42 or held by a second tool to prohibit rotation of the nuts. The adjustment is continued until the length of the spacing members can no longer be shortened while the shank 2 is secured in the hollow tubular member 6 by clevis pin 9. Essentially all of the play in the coupling of the trailer hitch head to the drawbar is thus eliminated by the clamping action of the attachment. In this embodiment, the attachment not only eliminates play in the coupling, but the attachment also acts as a second locking means to lock the hitch head to the drawbar should the clevis pin fail.

Although the above preferred embodiments have shown the use of plates and adjustable spacing means including spacing members in the form of threaded nuts and bolts, it would be apparent to one skilled in the art that the ends of the spacing means could be mounted directly to the hitch head and the drawbar respectively and that the spacing means could consist of any type of adjustable spacing member such as a pneumatic piston or the like. Therefore, although the preferred embodiments of the invention have been described in detail, it will be understood by those skilled in the art that variations may be made thereto without departing from the spirit of the invention or the scope of the appended claims.

The embodiments of the invention in which an exclusive property or privilege is claimed are defined as follows:

1. In combination a trailer hitch including a clevis pin, a trailer hitch head having a ball secured thereto and a shank extending therefrom, a trailer hitch drawbar having a hollow tubular member adapted to receive said shank and a clevis pin aperture adapted to receive said clevis pin locking said shank in said hollow tubular member such that said hitch head is removably coupled to said drawbar and a trailer hitch attachment for eliminating essentially all of the play in the coupling of said trailer hitch head to said trailer hitch drawbar; said attachment comprising a first plate provided with a first aperture of a shape and size to permit said shank to pass therethrough and a first skirt portion surrounding said first aperture, a second plate provided with a second aperture surrounded by a second skirt portion, said second aperture having a shape and size adapted to permit said shank to pass therethrough; a spacing means connecting said plates, said spacing means comprising first and second spacer members, each spacer member comprising a threaded bolt, a means for facilitating adjustment and a spacer member adjustor with a cooperating thread to threadably engage said bolt, each of said spacer members having a length which is adjustable by turning said bolt with respect to said spacer member adjustor; each of said spacer members having locking means for locking said bolt relative to said spacer member adjustor at a desired position so that a desired length of said spacer member is maintained; the arrangement being such that said first plate is secured on said drawbar such that said first plate cannot move with respect to said drawbar with said shank extending through said first aperture and said second plate is secured on said hitch head such that said second plate cannot move with respect to said hitch head with said shank extending through said second aperture and being removably secured in said hollow tubular member; said spacer members connecting said plates where said means for facilitating adjustment are exposed in a manner to allow adjustment of the spacer members by means of a tool; said spacer members being adjusted to space said plates such that said hitch head cannot move with respect to said drawbar while said shank is removably secured in said hollow tubular member by said clevis pin to eliminate essentially all the play in the coupling of said hitch head to said drawbar; said locking means adjusted to a position to maintain the desired adjusted length of said spacer members.

2. An attachment as claimed in claim 1 wherein the spacer member adjusters are a pair of nuts welded to one of said skirt portions opposing one another slightly below the centre of said one of said skirt portions.

3. An attachment as claimed in claim 2 wherein said skirt portions are provided with a resilient material having a thickness of 1/16 inch to act as a sound damper.

* * * * *